United States Patent [19]

Brar et al.

[11] Patent Number: 4,975,398
[45] Date of Patent: Dec. 4, 1990

[54] HIGH IMPACT STRENGTH CERAMIC COMPOSITE HEAD PAD MATERIAL

[75] Inventors: Amarjit S. Brar, Edina; Jagdish P. Sharma, Bloomington, both of Minn.

[73] Assignee: Magnetic Peripherals Inc., Minnetonka, Minn.

[21] Appl. No.: 247,188

[22] Filed: Sep. 21, 1988

[51] Int. Cl.$^5$ .............................................. C04B 35/46
[52] U.S. Cl. .................................. 501/136; 501/135; 360/127; 360/103
[58] Field of Search ................ 501/136, 135; 360/127, 360/103

[56] References Cited

U.S. PATENT DOCUMENTS 4,835,640  5/1989  Endo et al. ........................ 360/103

FOREIGN PATENT DOCUMENTS 217688  6/1987  Japan .
3134559  6/1988  Japan .

Primary Examiner—William R. Dixon, Jr.
Assistant Examiner—Melissa Bonner
Attorney, Agent, or Firm—Joseph J. Kaliko; Edward P. Heller, III

[57] ABSTRACT

A ceramic head pad material which exhibits superior toughness and lubricating material characteristics over known materials, particularly in the areas of toughness/resilience, damping, solid lubricity, reduced brittleness and chipping (without a change in bulk hardness), and improved thermal expansion, results from optimizing the amount of strontium oxide (SrO) in a calcium titanate ceramic. In particular, a ceramic material with approximately 5% to 7% SrO in a calcium titanate matrix (with approximately 6% SrO being the optimal concentration), may be utilized to realize the aforestated improved toughness and lubricating characteristics.

4 Claims, 4 Drawing Sheets

HIGH IMPACT STRENGTH CERAMIC COMPOSITE HEAD PAD MATERIAL

BACKGROUND OF THE INVENTION

1. Field of the Invention

The present invention relates generally to ceramic materials used to fabricate composite magnetic disk sliders for magnetic heads and used to fabricate other sliding parts subject to friction and wear. More particularly, the invention relates to an improved ceramic material for composite magnetic disc sliders with enhanced tribological characteristics that reduce both the wear and friction experienced in a magnetic head/disk interface thereby increasing the life of the slider and disk media.

2. Description of the Related Art

In magnetic head-supporting members (referred to as "sliders" hereinafter), it is desired to adapt the thermal expansion coefficient of the slider to that of the magnetic head supported by the slider by appropriately selecting the compostion of the ceramic used to fabricate the slider.

Since the slider supports very small magnetic pole pieces, very precise machine processing is necessary when fabricating the slider. Accordingly, it is desirable that the material used for slider fabrication have excellent processability characteristics. In particular, it is required that the resistance against grinding (cutting) be low and that chipping resistance be excellent.

Solid lubricant characteristics for the head material are also desirable.

As the magnetic recording density of the magnetic storage disks increases, it is necessary to reduce the distance between the head and the disk surface, thus reducing the air cushion in the interface. This increases the frequency of head slider/disk impact during the use of the disk drive. To reduce the risk of wear associated with this impact and to improve start/stop conditions generally, it is well known to apply a lubricating material, such as a flurocarbon, on the disk.

The lubricant applied needs to be of optimun thickness since too thick a lubricant causes interference with the head/disk interface and too thin a lubricant will cause excessive disk wear.

On the other hand, it is known that the surface of a magnetic head slider opposite the disk surface also influences the behavior with respect to the contact between head and disk which is a further reason that the materials used for disk sliders must be selected carefully.

It is well known to use, as pad materials, calcium titanate and barium titanate when fabricating composite heads because of the excellent mechanical properties and uniform structures of these ceramics. Calcium titanate is generally used in combination with a manganese zinc ferrite core material, because calcium titanate's thermal expansion coefficient is substantially equal to that of Mn-Zn ferrite (100 to $200 \times 10^{-7}$/ C.). A Barium titanate ceramic material is another well known material generally used in combination with a nickel zinc ferrite core material. Again, because of the substantially equal thermal coefficients of the ceramic and the core.

Unfortunately, it is also known that in components made of these materials chipping is readily caused at the machining step, load resistance is large at the grinding step, and therefore, these materials are defective in that their processability is poor.

Technology has also changed making the need for a composite ceramic material having both good processability characteristics and solid lubrication characteristics more important. Prior art heads used to fly over a disk after head speeds reached 2400 to 3600 RPM. Heads were taken off before discs were stopped and as a result there was no physical contact between heads and disks.

According to the new Winchester technology, heads land on the disks and then take off from the disks, so there is a significant amount of contact between these components. To reduce the friction and wear of the disks and head pads, disks are lubed in the problematic fluid manner referred to hereinbefore. Again, some type of solid lubricant to avoid too thin or too thick an application would be desirable since the requirement of monitoring and maintaining a controlled amount of lubricant could be avoided.

Accordingly, it would be desirable if a head pad material could be developed having an optimum quantity of lubricant to reduce the friction and wear between the head and disc and at the same time provide the ideal physical properties for cutting, lapping, and polishing of the head pad.

One of ordinary skill in the art will be aware that a number of manufacturers make calcium titanate ceramic material for magnetic recording heads but that the desired characteristics set forth hereinabove do not exist. By way of example, Kyocera International, Inc. makes two calcium titanate ceramic materials, T0710 and T0715. The only difference between the performance specifications for the two materials is their thermal expansion coefficient. T0175 has a higher thermal expansion then T0710. This higher thermal expansion property is achieved in T0715 by the addition of some strontium oxide (SrO) in the ceramic material recipe.

Independently, it is well known that certain metal oxides, like SrO, ZrO and Y203 act as solid lubricants in certain temperature ranges. Accordingly, it would be desirable to combine a material exhibiting solid lubricant characteristics, in an optimal weight percent and functional in predetermined temperatue ranges, to reduce friction and wear, while at the same time optimizing the physical properties of impact strength, fracture toughness, resistance to deformation, chipping and cracking, of the ceramic material.

SUMMARY OF THE INVENTION

It is therefore a primary object of the present invention to provide a head pad material which exhibits improved toughness and lubricating characteristics over known materials, particularly in the areas of toughness/resilience, damping, solid lubricity, reduced brittleness and chipping (without a change in bulk hardness) and improved thermal expansion.

According to the invention, an improved ceramic material exhibiting the desired properties set forth hereinabove, is achieved by optimizing the amount of strontium oxide (SrO) in a calcium titanate ceramic. In accordance with the preferred embodiment of the invention, a ceramic material with approximately 6% SrO in a Calcium Titanate matrix meets the desired objective in an optimal fashion. In fact, as will be demonstrated hereinafter, a range of approximately 5 to 7% SrO in the matrix yields improved materials for use in the manner contemplated.

Additionally, it has been determined that including approximately 2% $AL_2O_3$ in combination with the SrO in the matrix yields an optimal weight for the ceramic material.

The invention features a ceramic material suitable for realizing the primary object and desirable head pad material features recited hereinbefore. These and other objects and features will be recognized by those skilled in the art upon reviewing the detailed description set forth hereinafter in conjunction with the Drawing.

DETAILED DESCRIPTION

Copending application Ser. No. 096,185, filed Sept. 11, 1987 and assigned to the same assignee as this invention, describes appparatus and methods for testing surface properties of a material. The copending application describes a micro impact tester which was utilized to test variations of the new ceramic material taught herein, against one another, and to test the new material against materials commercially available from Kyocera (TO710 and TO715) and 3M.

The micro impact tester, taught in copending application Ser. No. 096,185, to the extent necessary to support the results set forth herein, is hereby incorporated by reference.

Figure 1:
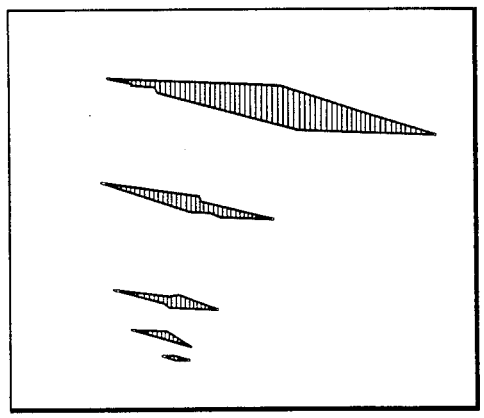
FIG. 1 depicts the results of a micro impact test carried out on a Kyocera ceramic without SrO. What is shown is the deformation pattern (cracks and chipping) resulting from the impact test.

FIG. 1 depicts the results of a micro impact test using the aforesaid micro impact tester on a Kyocera ceramic (TO710) without SrO. This ceramic material is hard and brittle and has a tendency to crack and chip as shown in FIG. 1. Furthermore, the material has no appreciable solid lubricant constituent.

The ceramic under test that produced the results depicted in FIG. 1, is a calcium titanete type ceramic with the following common constituents:

TABLE 1

| No. | Element | Percent |
| --- | --- | --- |
| 1. | Calcium Oxide | 37.2 |
| 2. | Titanium Oxide | 62.0 |
| 3. | Aluminum Oxide | 0.37 |
| 4. | Silicon Oxide | 0.38 |
| 5. | Zinc Oxide | 0.002 |
| 6. | Barium Oxide | 0.019 |
| 7. | Zirconium Oxide | 0.013 |
| 8. | Iron Oxide | 0.025 |
| 9. | Magnesium Oxide | 0.053 |

As can be observed with reference to FIG. 1, this material chips even when subjected to small impact energy, and shows no signs of toughness or resilience and plastic deformation. This material was also tested for use in fabricating head pads in disk drives and exhibited very high and random, friction and wear characteristics.

Figure 2:
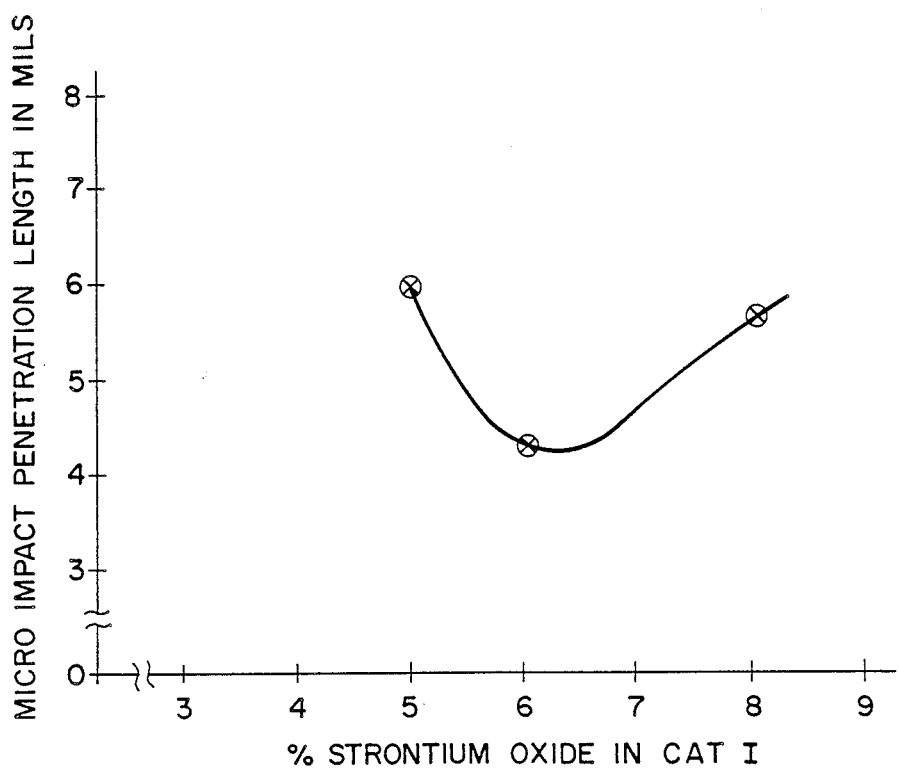
FIG. 2 graphically depicts the toughness of the novel ceramic material as a function of percent SrO in the Calcium Titanate matrix.

By adding approximately 6% SrO to the Calcium Titanate matrix, the strength of the ceramic material was seen to dramatically increase. This is depicted graphically in FIG. 2.

Next, the Kyocera TO715 material was analyzed for strength, toughness and wear characteristics since it has an SrO constituent (approximately 8% by weight). The TO715 constituents are shown in Table 2 and this material was tested against varients of the new ceramic material, with varying percentages of SrO, as shown in Tables 3, 4, 5 and 6.

TABLE 2

| KYOCERA (TO715) | | | |
| --- | --- | --- | --- |
| No. | Element | | Percent |
| 1. | CaO | | 35.3 |
| 2. | TiO2 | | 53.5 |
| 3. | SrO | | 8.81 |
| 4. | Al2O3 | | 1.98 |
| 5. | SiO2 | | 0.21 |
| 6. | ZrO | | 0.03 |
| 7. | BaO | | 0.01 |
| 8. | ZnO | less than | 0.20 |
| 9. | Fe2O3 | | 0.04 |

TABLE 3

| 8% SrO | | |
| --- | --- | --- |
| No. | Element | Percent |
| 1. | CaO | 32.5 |
| 2. | TiO2 | 55.8 |
| 3. | SrO | 8.2 |
| 4. | Al2O3 | 2.35 |
| 5. | SiO2 | 0.25 |
| 6. | ZrO | 0.03 |
| 7. | BaO | 0.09 |
| 8. | ZnO | 0.05 |
| 9. | Fe2O3 | 0.04 |

TABLE 4

| 6% SrO | | | |
| --- | --- | --- | --- |
| No. | Element | | Percent |
| 1. | CaO | | 37.6 |
| 2. | TiO2 | | 55.9 |
| 3. | SrO | | 5.7 |
| 4. | Al2O3 | | 1.9 |
| 5. | SiO2 | | 0.15 |
| 6. | ZrO | | .056 |
| 7. | BaO | less than | 0.009 |
| 8. | ZnO | | 0.007 |
| 9. | Fe2O3 | | .04 |

TABLE 5

| 5% SrO | | |
| --- | --- | --- |
| No. | Element | Percent |
| 1. | CaO | 36.3 |
| 2. | TiO2 | 55.5 |
| 3. | SrO | 4.8 |
| 4. | Al2O3 | 1.9 |
| 5. | SiO2 | 0.22 |
| 6. | ZrO | 0.6 |
| 7. | BaO | 0.12 |
| 8. | ZnO | 0.04 |
| 9. | Fe2O3 | 0.07 |

TABLE 6

| | 2% SrO | |
|---|---|---|
| No. | Element | Percent |
| 1. | CaO | 37.8 |
| 2. | TiO2 | 55.8 |
| 3. | SrO | 2.3 |
| 4. | Al2O3 | 1.9 |
| 5. | SiO2 | 0.22 |
| 6. | ZrO | 0.6 |
| 7. | BaO | 0.12 |
| 8. | ZnO | 0.04 |
| 9. | Fe2O3 | 0.07 |

Figure 3:
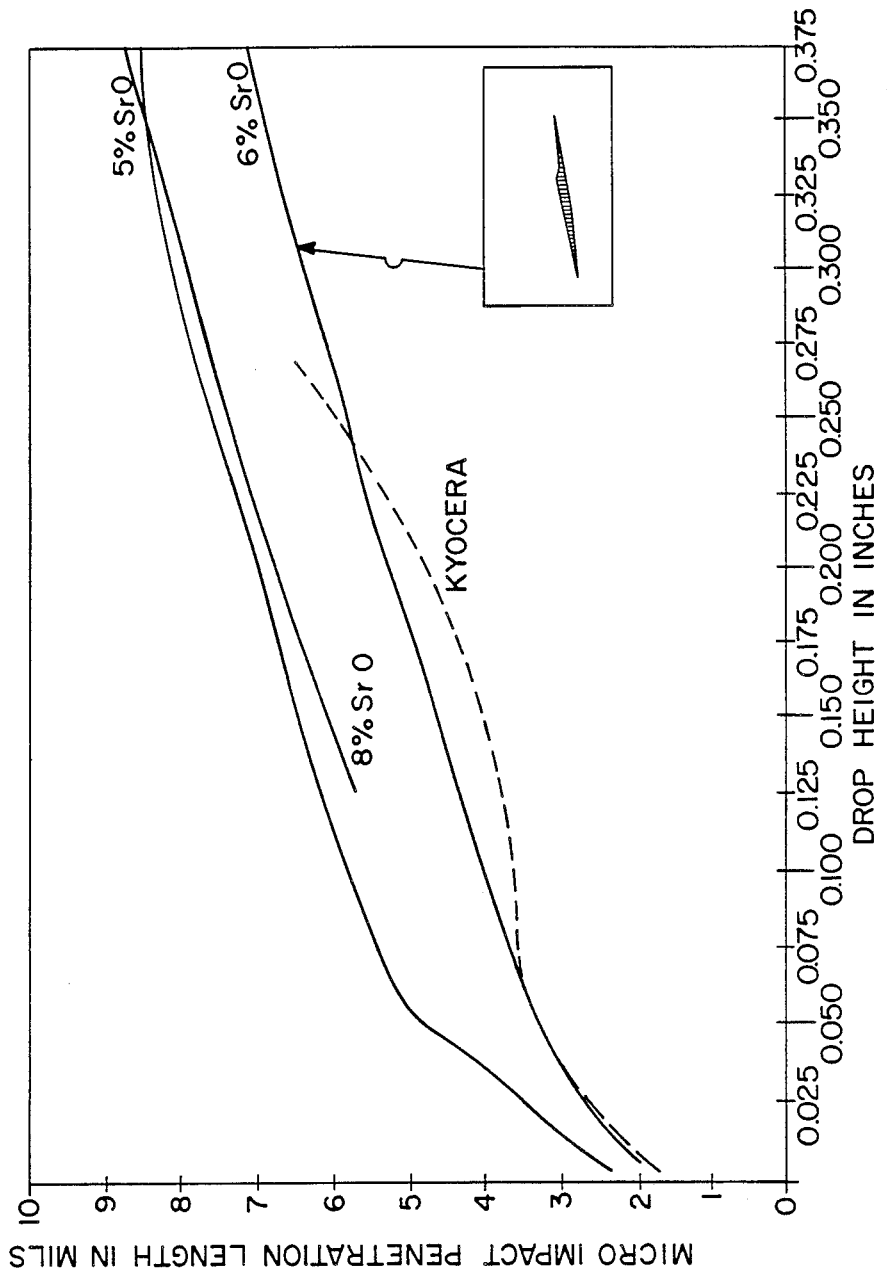
FIG. 3 graphically depicts the toughness of various ceramic materials with varying impact load. Also shown are the results of a micro impact test on the novel ceramic material with a 6% SrO content, with varying impact load.

FIG. 3 depicts the relative toughness of the blends shown in Tables 2, 3, 4 and 5. It can be seen that the material with 6% SrO performed the best and it can be observed by comparing FIGS. 1 and 3 that the micro impact test results depicted were significantly improved by the inclusion of the approximately 6% SrO in the ceramic.

The blend consisting of constituents shown in Table 6 (2% SrO) was rejected as not demonstrating the desired impact strength, fracture toughness, resilience and good wear characteristics being sought.

Figure 4:
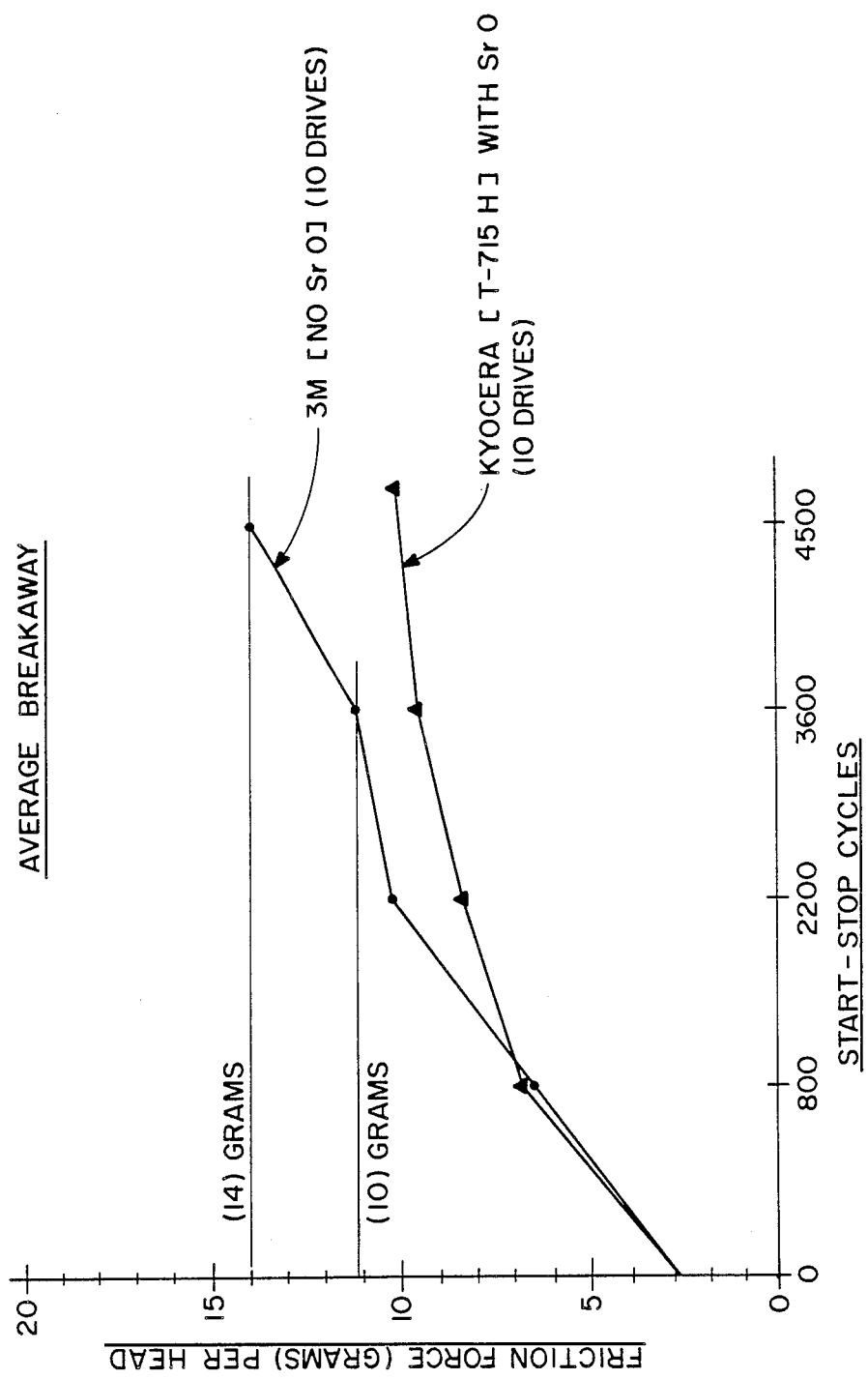
FIG. 4 graphically depicts the reduced friction and better wear characteristics of a ceramic that includes SrO versus ceramic materials without SrO.

Further testing, the results of which are depicted in FIG. 4, depicts the improved friction and wear characteristics achieved when SrO is incorporated as part of the ceramic. The average breakaway curves of the Kyocera TO715 versus a 3M blend with SrO are shown, with the T0715 (containing SrO) significantly outperforming the 3M without SrO.

The 3M material constituents are shown hereinafter in Table 7 for the sake of completeness.

TABLE 7

| | 3M Material (without SrO) | | |
|---|---|---|---|
| No. | Element | | Percent |
| 1. | Calcium Oxide | | 41.3 |
| 2. | Titanium Oxide | | 58.0 |
| 3. | Stronium Oxide | | 0.012 |
| 4. | Aluminum Oxide | | 0.43 |
| 5. | Silicon Oxide | | 0.15 |
| 6. | Zirconium Oxide | | 0.058 |
| 7. | Barium Oxide | | 0.013 |
| 8. | Magnesium Oxide | less than | .2 |
| 9. | Iron Oxide | | 0.074 |

With reference to FIG. 4 it should be noted that the same lot of sputtered media was used in both of the materials depicted.

Figure 5:
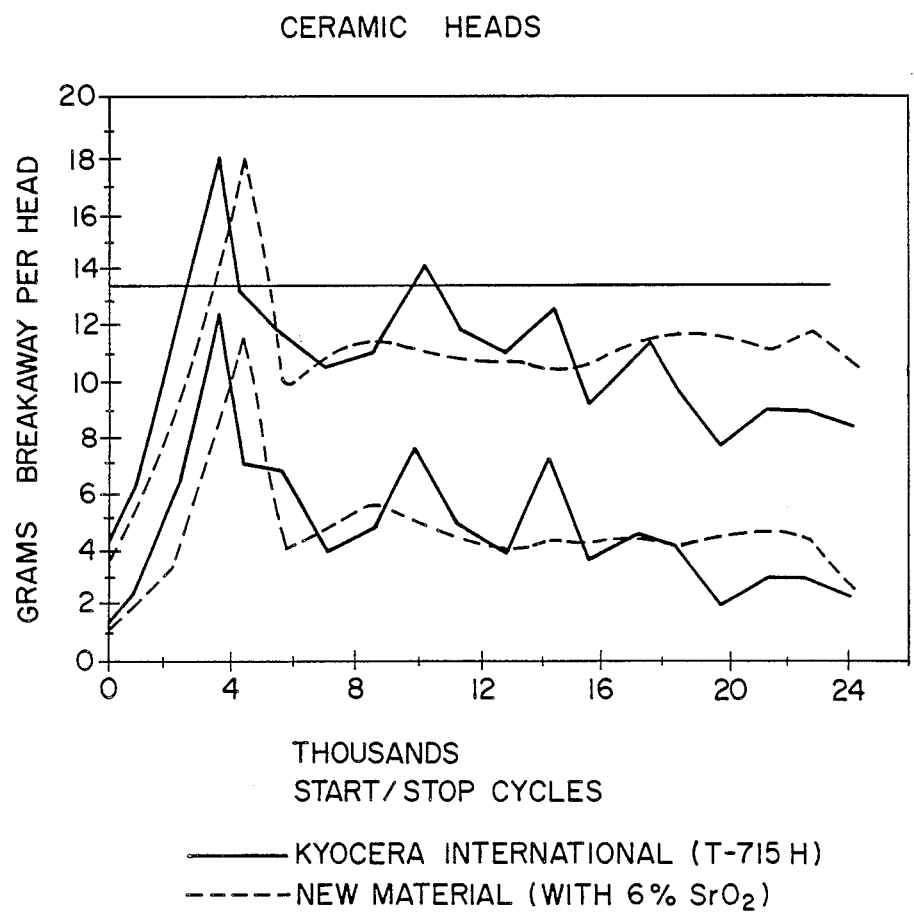
FIG. 5 graphically depicts the friction and wear charactertics of the novel ceramic material, with approximately 6% SrO versus Kyocera's TO715, which also includes SrO.

FIG. 5 is presented to show that the material with approximately 6% SrO is superior to TO715 as far as friction and wear characteristics are concerned, over a 24 thousand start/stop cycle test. The friction curve for the new material can be seen to be much smoother than the Kyocera TO715 friction curve. This indicates that the new material lends itself to virtually eliminating "stick slip" problems, which in turn means that the friction and wear at the interface can be minimized.

Based on the experimentation described hereinbefore, it is concluded that to achieve the desired characteristics for the new material, the optimum value for SrO is between 5% and 7%, by weight percent, in a calcium titanate ceramic, with approximately 6% SrO being ideal. Furthermore, it was concluded that when the composite ceramic included approximately 1.8% to 2.4%, by weight percent, of Al2O3, maximum toughness and good damping properties were observed. There was no chipping in the material, and it displayed desirable plastic deformation showing the desired solid lubricative effects.

The other principal constituents of the optimal head pad material were determined to be approximately 55% to 58%, by weight percent, of titanium oxide and approximately 36% to 38%, by weight percent, of calcium oxide. Trace elements, less than 0.5% by weight percent total, of zinc oxide, barium oxide, zirconium oxide, iron oxide and silicon oxide were also constituents of the new material.

Head/pad sliders were then made with the disclosed material where the calcium titanate included approximately 6% strontium oxide and 2% aluminum oxide. These heads were tested for tribological properties along with the heads made from material without the strontium oxide and Al2O3, at the single disk level and in full disk drives. The heads with the new material showed superior performance.

The composition invented optimizes the weight percent of SrO in the calcium titanate material to reduce the friction and wear at the head/disk interface in memory disk drives while at the same time providing a material that exhibits optimum micro mechanical properties, i.e. impact strength, fracture toughness and ideal deformation properties without chipping and cracking. Thus, all of the aforesaid objectives were met by the new material. The foregoing disclosure and description of this invention is illustrative only. Various changes may be made within the scope of the appended claims without departing from the spirit and scope of the invention.

What is claimed is:

1. A composite magnetic head slider, said composite magnetic head slide including at least one surface consisting essentially of a calcium titanate ceramic material that includes, as an essential ingredient, strontium oxide in a concentration of between 5% and 7% by weight percent.

2. A composite magnetic head slider as set forth in claim 1 wherein said ceramic material further includes as an essential ingredient approximately 2% by weight of Al2O3.

3. A composite magnetic head slider for magnetic heads flying on an air cushion over a moving magnetic disk, said composite magnetic head slider including at least one surface consisting essentially of a calcium titanate ceramic material that includes, as an essential ingredient, strontium oxide in a concentration of between 5% and 7% by weight percent.

4. A composite magnetic head slider as set forth in claim 1 wherein said ceramic material further includes as an essential ingredient approximately 2% by weight of Al2O3.

* * * * *